United States Patent [19]

Abele

[11] 4,123,128
[45] Oct. 31, 1978

[54] PORTABLE PIE CASE

[76] Inventor: Carl L. Abele, 4863 Rainier Ave. South, Seattle, Wash. 98118

[21] Appl. No.: 720,259

[22] Filed: Sep. 3, 1976

[51] Int. Cl.$^2$ .............................................. A47F 3/00
[52] U.S. Cl. ..................................... 312/244; 211/71; 211/135; 312/132; 296/3
[58] Field of Search ................... 211/71, 72, 90, 135, 211/128, 153, 134, 188; 312/128, 132, 111, 245; 206/562, 563; 296/8, 3, 22

[56] References Cited

U.S. PATENT DOCUMENTS

| 152,550 | 6/1874 | Collins | 211/71 |
|---|---|---|---|
| 156,059 | 10/1874 | Jordan et al. | 211/96 X |
| D. 232,677 | 9/1974 | Scotland | 312/245 X |
| 785,591 | 3/1905 | Conez | 211/71 X |
| 1,106,057 | 8/1914 | Pockett | 108/24 |
| 1,815,813 | 7/1931 | Travis | 296/8 X |
| 1,862,593 | 6/1932 | Harbison | 211/153 |
| 2,469,776 | 5/1949 | McGee | 211/90 |
| 2,636,797 | 4/1953 | Alheit | 312/132 X |
| 2,851,301 | 9/1958 | Jagsch | 296/3 |
| 3,513,984 | 5/1970 | Miller | 211/134 |
| 3,779,623 | 12/1973 | Motohashi | 312/111 X |
| 3,851,938 | 12/1974 | McCowan et al. | 312/111 X |

FOREIGN PATENT DOCUMENTS

| 136,672 | 7/1952 | Sweden | 211/71 |
|---|---|---|---|
| 1,068,579 | 5/1967 | United Kingdom | 211/90 |

Primary Examiner—Roy D. Frazier
Assistant Examiner—Robert W. Gibson, Jr.
Attorney, Agent, or Firm—Graybeal, Barnard & Uhlir

[57] ABSTRACT

Pies within pie pans are received within circular cut-out portions of removable shelves which are supported vertically apart within a pair of side-by-side compartments of a portable pie case. The shelves are formed from relatively thin sheet metal and include stiffening flanges on their sides and rear and bordering the circular cut-out portions. The side flanges are bent down at an angle of about 45° from the general plane of the shelf. These flanges are received within complementary slideway slots formed in the side walls of the compartments. The central front portion of each shelf is cut away to facilitate placement and removal of the pies. The portion of each shelf bordering the circular cut-out extends about the pie an angular distance substantially greater than 180°. The bottom, top, rear and side walls of the pie case are cast monolithically from a structural plastic. A throw-away cardboard front panel closes both compartments. Mounting recesses are provided in the back wall of the case for engaging hooks provided on an internal wall of a transporting vehicle.

11 Claims, 5 Drawing Figures

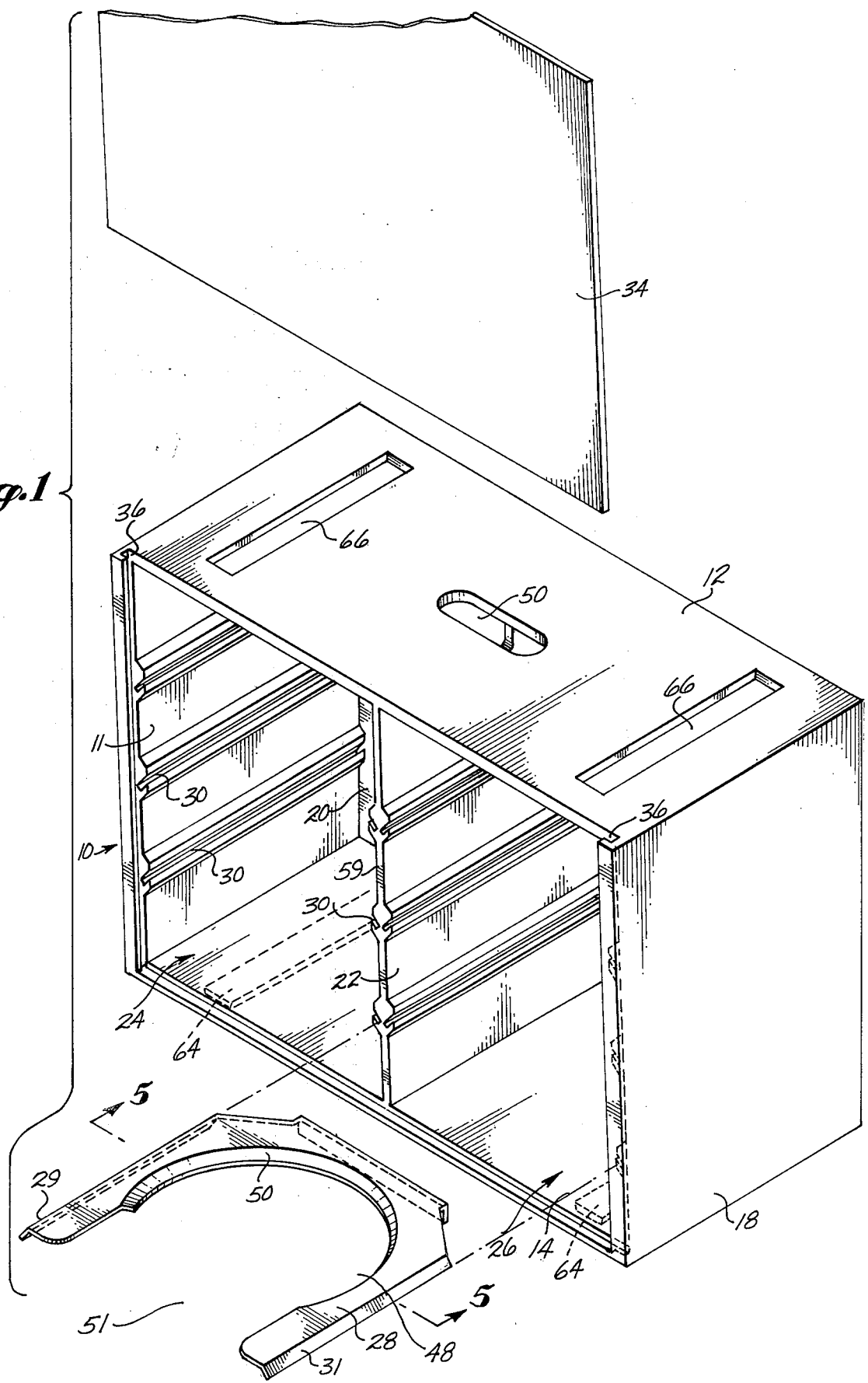

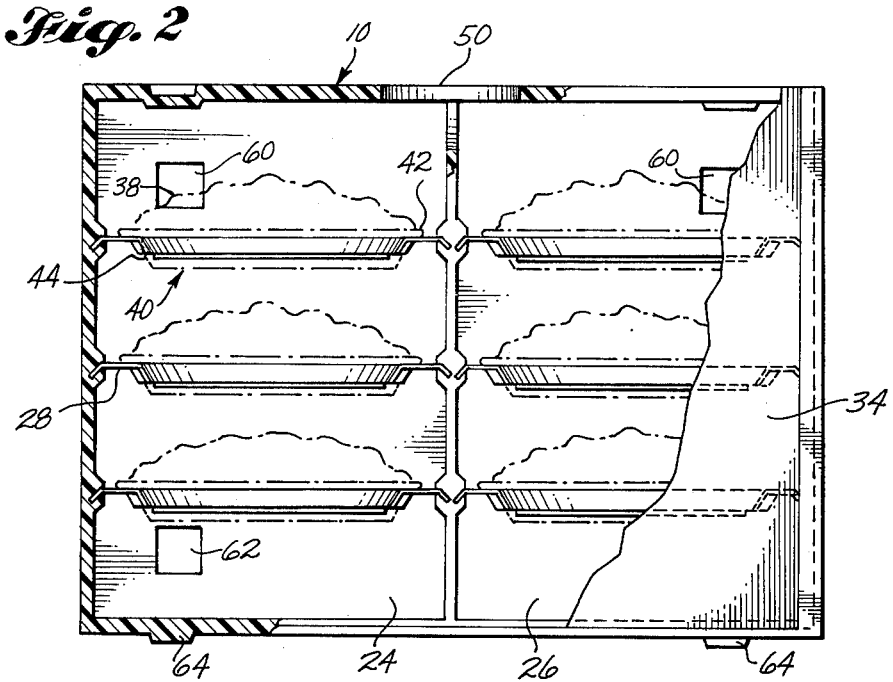
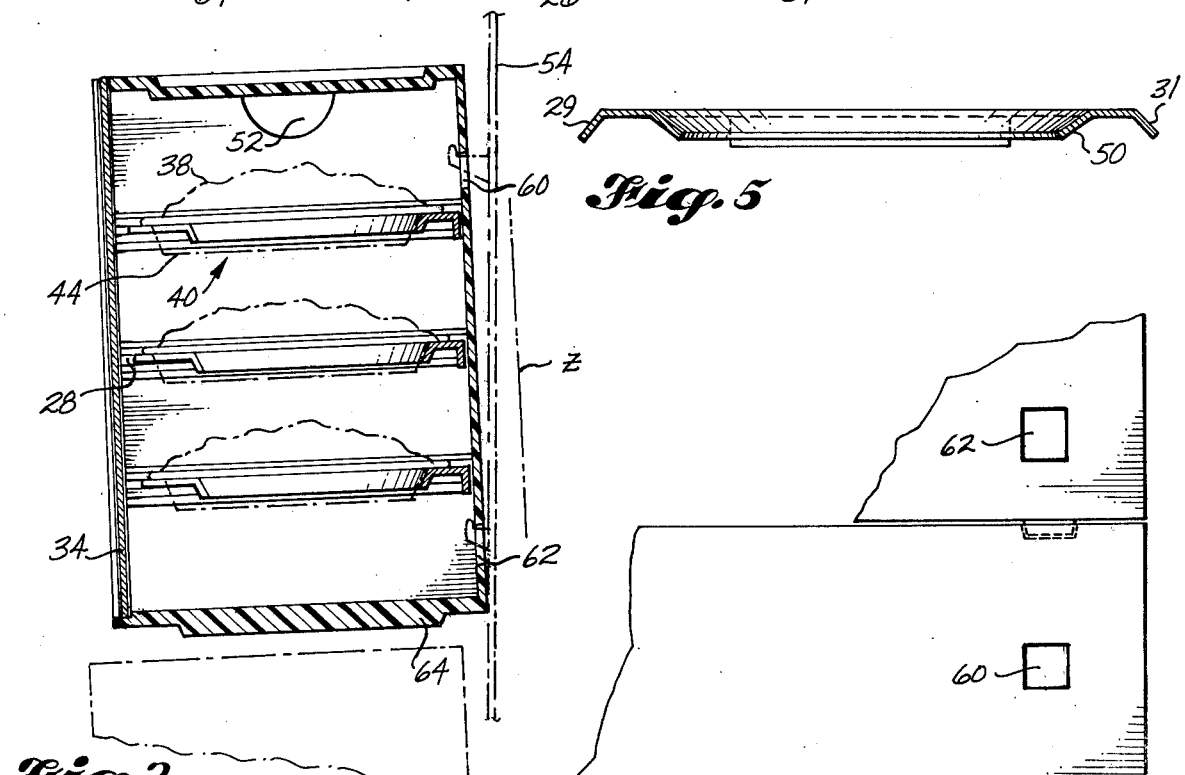
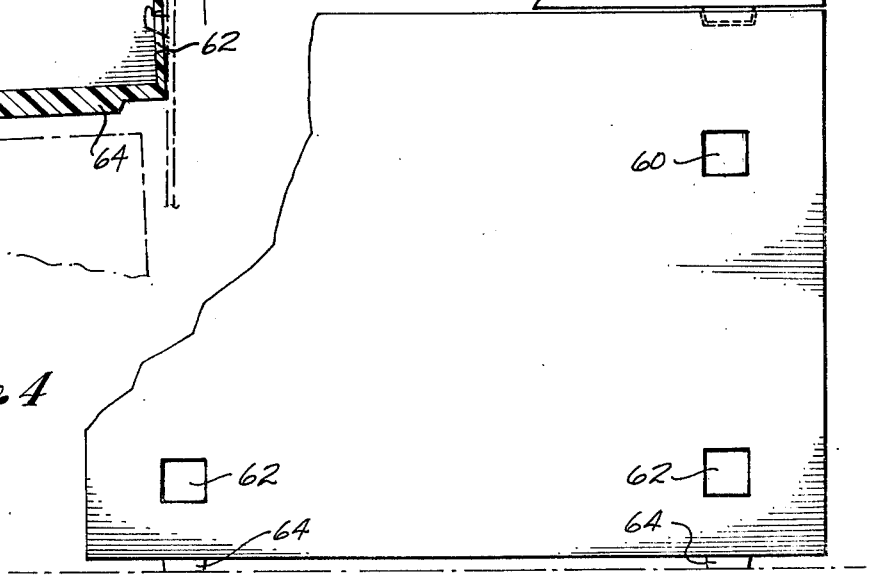

PORTABLE PIE CASE

BACKGROUND OF THE INVENTION

1. Field of the Invention

This invention relates to apparatus for facilitating the movement of pies from a bakery to a restaurant or other place of consumption, and in particular to a portable pie case which is loaded with pies at the bakery, is hand carried between the bakery, a delivery truck, and a customer's place of business, and which is adapted to adequately support pies which are in relatively thin metal foil pie pans, and to protect pies against damage by restraining them against sliding movement while in the case.

2. Description of the Prior Art

The most common way of commercially transporting pies from their place of manufacture to a customer's place of business involves the use of cabinet type pie racks built into a delivery truck. These racks comprise compartments which are slightly wider than the diameter of the pies and in which a plurality of pies are supported vertically apart. The pies are individually placed into and removed from the compartments. Each pie is supported on and by small support members which underlie only relatively small, diametrically opposed portions of the pie pan lip.

Problems were immediately experienced with this type of pie rack when disposable metal foil type pie pans replaced returnable pie pans. This was because the rims of the foil type pie pans lacked sufficient stiffness to carry the weight of the pies without bending. Some users attempted to solve the problem by using two pans with each pie instead of one. However, this practice only added to the cost of the pies; it was generally unsuccessful in solving the problem. Also, the pies still had to be individually placed into and removed from the racks.

Another known method of transporting pies involves the use of wooden boxes in which the pies are supported on vertically spaced apart shelves. In practice, a plurality of pies are loaded into each wooden box in the bakery. Then, a cardboard box is inverted over each wooden box to provide an enclosure. The pie containing boxes are then hand trucked or otherwise loaded into delivery trucks and later are moved out from the delivery trucks into the customer's place of business. One disadvantage of this manner of transporting pies is that the pies are free to slide on the shelves and can be damaged by impacting against a wall of the box. Also, the boxes are very difficult to clean and as a result are quite often not cleaned. Further, in practice, it has been found that the customers quite often assume that these boxes represent little value to the bakery, particularly after they have become quite dirty from much use. As a result, a large number of the boxes are not returned, but rather are used by the customer for some other purpose or are merely discarded. The losses suffered have been substantial and, of course, they add to the cost of conducting business.

U.S. Pat. No. 785,591, granted Mar. 21, 1905, to Germain Conez discloses a pie displaying cabinet for use in restaurants. Such cabinet includes side located support members of the same general type as described above in connection with the cabinets which are built into the delivery trucks. In other words, the support members underlie and provide support for only a pair of relatively small diametrically opposed lip portions of each pie pan. The patentee states that this manner of supporting the pies, together with some other features of his cabinet, makes the cabinet easy to clean. However, it can easily be seen by an inspection of this patent that the opposed edge support would require the use of a pie pan of substantial stiffness in order to prevent the pie pan from collapsing under the weight of the pie.

U.S. Pat. No. 3,636,797, granted Apr. 28, 1953, to Henry A. Alheit discloses another type of display case for pies. It includes wire members adapted for engaging diametrically opposed portions of each pie plate. However, in this case, the wire members are curved so that they will underlie and support a larger portion of the lip of the pie pan. The curved nature of the wire support members also results in such members functioning to restrain the pies against unwanted sliding movement. This patent should be carefully considered when putting the present invention into proper perspective relative to the prior art, together with the following less pertinent patents:

U.S. Pat. No. 156,059, granted Oct. 20, 1874, to Scow D. Jordan and Frank H. Jordan;

U.S. Pat. No. 369,044, granted Aug. 30, 1887, to James K. Cleary;

U.S. Pat. No. 3,199,683, granted Aug. 10, 1965, to Edward Graswich; and

U.S. Pat. No. 3,893,569, granted July 8, 1975, to Frank R. Hoch.

SUMMARY OF THE INVENTION

The pie case of this invention is basically characterized by top, bottom, side and rear walls which together define at least one pie receiving compartment, and a plurality of individually removable pie holding shelves within said compartment. Each shelf is formed to include a central opening sized to receive the body portion of a pie pan. Also, each shelf is preferably centrally open at its front to provide hand room, to facilitate movement of a pie onto and off from such shelf. The portion of the shelf immediately bordering the central opening underlies a peripheral portion of the pie pan and carries the weight of the pie. The amount of support provided extends around the pie pan an angular amount substantially about one hundred and eighty degrees. As a result, the weight supporting area is large enough that a single foil type pie pan can be used without danger of its collapsing and the pie being damaged or even dropping. Also, it results in the pie being restrained against lateral movement in any direction. Thus, the pie is protected against sliding into a barrier and being damaged.

According to an aspect of the invention, the shelves are constructed from relatively thin sheet aluminum or other structurally suitable sheet material. A substantial part of the edge portions of the shelves are flanged for the purpose of making the shelves stiff so that they will not become easily bent out of shape during use. The two side edges of each shelf may be turned downwardly at an angle substantially less than ninety degrees. Slideways for supporting the shelves may be provided in the form of side wall slots set at substantially the same angle. One advantage of this arrangement is that it is extremely simple and aids in minimizing the amount of material that must be used in both the shelves and the side walls. Another advantage is that it results in the shelves being structurally locked to the side walls of the compartment, so that they become brace members for the side walls. This enables the side walls to be made thinner than they would have to be if unbraced.

According to another aspect of the invention, the pie transporting case is closed by use of only a single panel of cardboard or other disposable material. Such panel may be received within vertical slideways provided at the opposite sides of the open front of the case.

Another aspect of the invention involves providing the pie cases and the walls of the delivery truck with means for detachably securing the pie cases to such side walls in horizontal and vertical rows. Projecting components may be secured to the walls of the delivery truck and adapted to mate with complementary recessed components formed in the back walls of the pie cases in such a manner that each case can be easily lifted off from or onto its place on the truck wall. Preferably, the apparatus used is adapted to support the pie cases in a slightly forwardly leaning attitude, so that the upper front portion of any given case will extend outwardly from the truck wall a greater distance than the lower front portion of the case above it. This is done so that the front closure panel of a case can be slid upwardly (e.g., for the purpose of inspecting the pies within the case) without having to remove the case from its position on the truck wall.

Preferably, the pie cases of the present invention are made from a molded structural plastic material which is easy to clean and which gives the pie cases an attractive and distinctive appearance, so that the customer will more readily accept them to be items of value which are to be returned to the pie manufacturer. The use of plastic also provides a weight saving of about fifty percent over the use of wood.

These and other features, objects and advantages of the present invention will be apparent from the detailed description of the preferred embodiment.

BRIEF DESCRIPTION OF THE DRAWINGS

FIG. 1 is a pictorial view of a hand-carriable pie case according to the instant invention and illustrates the housing with, in exploded form, a front wall and one removable pie holding shelf;

FIG. 2 is a front elevational view of a pie case according to the instant invention with a cut away section depicting a full complement of pies situated on the spaced shelves;

FIG. 3 is a sectional view, in fragment, depicting a vertically adjacent pair of pie cases suspended for transportation within a delivery vehicle;

FIG. 4 is a rear elevational view, in fragment, illustrating a stacked pair of pie cases; and FIG. 5 is a cross-sectional view of a removable pie receiving shelf taken along line 5—5 of FIG. 1.

DETAILED DESCRIPTION OF THE PREFERRED EMBODIMENT

Referring initially to FIG. 1, a hand-carriable portable pie case for receiving and carrying a plurality of pies therein is illustrated having a housing 10 including top and bottom walls 12 and 14, respectively. Side walls 16 and 18 are situated along either side of housing 10 and, together with rear wall 20, form a rigid box-like structure having an open front. A vertically extending intermediate side wall 22 is formed midway between said walls 16 and 18 and divides housing 10 into two laterally adjacent pie receiving compartments 24 and 26.

A plurality of removable shelves 28 are provided and are particularly shaped to receive and hold each pie against relative movement, the details of which will be described hereafter. Mounting means comprise opposed pairs of slideways 30 situated on either side wall of each compartment 24 and 26 which are complementary angled with the edges of shelf 28. Removable shelf 28 is provided with side edges 29 and 31 both of which are inclined downwardly and outwardly, the angle thereof being approximately 45° to the plane of the shelf.

A throw-away type removable front wall 34 is provided and is sized to extend side-to-side and bottom-to-top across the open face of both pie receiving compartments. Mounting means comprises opposed vertical slideways 36 situated at the front of side walls 16 and 18. Each slideway is adapted to receive the edge portion of front wall 36 therein. Front wall 36 is initially disposed in vertically above housing 10 and then is lowered downwardly within vertical slideways 36 to a closed position on bottom wall 14. Each shelf 28 is sized to be received in the pie receiving compartments with the front edge thereof immediately adjacent the front edges of the side walls so that outward movement of shelf 28, if any, will be limited by front wall 34.

A particular feature of the herein described portable pie case is that it is hand carriable and is particularly adapted to transport a number of pies without the necessity of individually handling each pie when loading and delivering the pies. This advantage is of significant benefit where a number of pies are transported on a regular basis from their point of manufacture, such as a bakery, to the customer's place of business, such as a restaurant. Rather than carry the pies into the transporting vehicle individually, a number of pie cases, each carrying a full complement of pies, can be quickly moved into and secured in the delivery vehicle in a manner hereinafter described in greater detail.

Referring now to FIG. 2, a plurality of separate pies 38 will be seen situated in a laterally adjacent arrangement within housing 10. Within each pie receiving compartment 24 and 26, each pie 38 is vertically spaced apart a sufficient distance to prevent contact with the vertically adjacent pie in addition to allowing room for the placement and removal of each pie.

As has been briefly discussed hereinbefore, a particular disadvantage with prior art pie cases has been that they are not well suited for supporting the vertical weight of a pie when situated in the newer foil type pans. As is known, such pie pans or tins are fabricated from a circular section of material, such as aluminum or the like, and are most often formed by stamp to shape. As is best seen in FIGS. 2 and 3, each pie pan comprises an annular lip 42 formed at the top of a dish-shaped body 44. The rigidity and strength of these newer pie pans, and particularly lip 42, is much less than the tin type formerly used so that these weaker pie pans tend to bend or warp if supported only on opposite sides of the lip.

Referring now to FIGS. 1 and 5, it will be seen that removable shelf 28 is particularly formed to cooperate with the dish-shaped body 44 and annular lip 42 of each pan 40 in order to provide and improve supporting shelves for each pie. Opening 48 is sized to snugly receive pie pan body 44 so that the lower surface of annular lip 42 contacts the upper surface of shelf 28 around opening 48. A flange 50 is situated around opening 48 and serves to increase the strength and rigidity of shelf 28 as the result of the cut-out portion. A forward opening 51 (FIG. 1) is laterally, centrally disposed and communicates with both the front edge of removable shelf 28 and opening 48 for accommodating the user's hand therein when pie 38 is either being positioned or removed from the shelf. As is best seen in FIG. 1, the upper surface of removable shelf 28 is formed to engage substantially more than 180° of the circumference of the lower annular surface of lip 42. This relatively long contact area between pie pan 40 and the edge of shelf 28 surrounding opening 48 distributes the weight of each pie over a substantial portion of pie pan 40 which minimizes stress concentration therein. It has been found that this improved support system will support the weight of most pies even if only one of the structurally weaker foil type pans is used with each pie.

As described hereabove, each pie 38 is normally manufactured in a pie pan and such a pan is most often delivered and sold with each pie. In a high volume commercial pie manufacturing operation, such as a bakery or the like, a number of pies are moved on a regular schedule from the point of manufacture to the customer's place of business, such as a restaurant or the like where they are ultimately consumed. Any damage to the pies, such as would result from the contact of a pie with its transporting container, would render the pie less marketable. Referring again to FIGS. 2 and 3, since the outer edge of each pie 38 normally extends onto the top surface of the annular lip 42 of pie pan 40 and is often a portion of the piecrust, it can be easily damaged or broken in the event it contacts housing 10. However, each of the plurality of removable shelves 28 are particularly adapted to cooperate with pie pan 40 in confining each pie to prevent unwanted movement thereof. Opening 48 (FIG. 1) is approximately centered with respect to the outward edges thereof and is sized to snugly receive the dish-shaped body 44 of pie pan 40 therein. The edge around opening 48 surrounds significantly more than 180° of the pie pan 40 so that each pie is held against significant lateral movement. This tight fitting relationship serves to retain each pie spaced away from the compartment side walls in the event housing 10 is submited to inertial forces during transporting.

Referring now to FIGS. 1-3, a handle is provided for lifting and carrying of the pie case and comprises a hand receiving opening 50 situated in top wall 12 of housing 10. Preferably, opening 50 is oblong shaped and is centered both between either side and the front and rear edge of top wall 12 so that housing 10 will be balanced when lifted. Intermediate side wall 22 has a semi-circular cut-out 52 (FIG. 3) therein which is disposed below hand receiving opening 50 to provide sufficient space for the fingers of a lifting hand.

As will be best understood by those of ordinary skill use of the portable pie case according to the instant invention will be helpful in reducing the overall transporting and labor costs involved in the delivery of pies and more effectively utilizing a delivery vehicle. For example, after pie 38 has been prepared at the bakery or other like place, it can be immediately positioned in one of the pie receiving compartments on shelf 28. When the full complement of pies ordered by the customer have been positioned in the pie receiving compartment, front wall 34 is slidably positioned within vertical slideway 36 to close the front of housing 10. The pie case, with its complement of pies therein, can then be set aside until it is ready to be moved into a delivery truck eliminating the necessity of further handling each pie individually. In addition, rather than carrying the pies separately into the delivery vehicle, the sealed pie cases, with their pies held snugly therein, are carried into the vehicle in a relatively short period of time.

Referring specifically to FIG. 3, a vertically adjacent pair of pie cases are disclosed hanging in a transporting vehicle. In preferred form, a plurlity of vertically spaced strips 54 are provided inside the delivery vehicle forming side wall mounts. Upper and lower pairs of vertical support strips 54 and extend outwardly therefrom. Mounting means for the pie case are provided and comprise pairs of upper and lower hook receiving openings 60 and 62, respectively, situated in rear wall 20 near either side thereof. Heretofore, pies were often transported in the back of a delivery truck by individually positioning them in cupboards or employing bulky wooden containers. By employing the pie case of the instant invention, truck loading and preparation time can be reduced since each case can be quickly carried into the vehicle and situated on the pairs of support hooks 56 and 58. To off load the pies at the delivery end, the reverse is also true in that each pie case can be carried directly into the restaurant or the like without the necessity of individually handling each pie and the entire pie case can be left for return at the next delivery.

However, in the event that a specific delivery involves a fewer number of pies than contained in an individual pie case, vertically adjacent housings 10 are disposed in their suspended position so that front wall 34 can be removed therefrom while still in place on hooks 56 and 58. As is seen in FIG. 3, this results from the fact that each pie case is situated in an outwardly tilted or inclined attitude from bottom to top so that front wall 34 can be lifted vertically and will be clear of the upper vertically adjacent pie case. Alternatively, and within the scope of this invention, the truck wall 54 could be made to slope inwardly from top to bottom, so that the pie cases are plumb but stairstepped. This arrangement is illustrated by FIG. 3, if wall 54 is viewed with reference to line Z as a vertical line.

In preferred form, housing 10 is fabricated from a plastic type material via an injection molding process or equivalent thereof. Plastic is particularly well suited to the present invention in that it can be quickly and easily cleaned and is more impervious to food stains and odors than the prior wooden containers. During cleaning, each removable shelf 28 is withdrawn from its supported position in opposed slideways 30 so that the obstruction caused by the vertically stacked shelves in each pie receiving compartment is eliminated allowing full access to all the corners of housing 10.

A particular advantage of the pie case according to the instant invention is that when fabricated from the preferred plastic material in the manner herein described, it forms a strong monolithic housing which can withstand significant abuse yet is much lighter in weight than the wooden racks of the prior art. In addition, due to the scarcity and increased cost of wood products, a pie case manufactured from a brightly colored plastic is more likely to be returned. In the preferred embodiment, each removable shelf 28 is formed from a flat section of relatively thin stock which is cut and formed to the shape hereabove described. As is best seen in FIGS. 1 and 5, a significant portion of the outer and inner edge portion of shelf 28 is flanged to increase its rigidity so that it will not bend significantly under the weight of pie 38. In addition, as is seen in FIG. 2, intermediate side wall 22, dividing housing 10 into laterally adjacent compartments 24 and 26, includes relatively thin portion 59 situated between the laterally adjacent slideways 30. With the laterally adjacent shelves 28 extending across pie receiving compartments 24 and 26, the side walls of housing 10 are additionally braced by the locking of the side edges 29 and 31 within opposed slideways 30.

As is best seen in FIGS. 1 and 4, a pair of cleats 64 (FIG. 4) are provided to increase the stability of stacked columns of pie cases by limiting relative movement between vertically adjacent housing. A cooperating pair of cleat receiving recesses 66 are provided in the same portion in top wall 12 near either side of housing 10 and are sized to loosely receive cleats 64 therein. In preferred form, each cleat 64 is a rectangularly shaped protrusion having a side wall which projects from the under side of housing 10 and engages the side wall of each cleat receiving recess 64.

The invention may be embodied in other specific forms without departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A portable pie case for receiving and carrying a plurality of pies spaced vertically apart, each pie being disposed in a pie pan having a dish body and a peripheral lip, comprising:
   a housing having top, bottom, side and rear walls, together defining at least one pie receiving compartment;
   a plurality of removable pie shelves, wherein each shelf comprises a relatively thin sheet member having a pie receiving opening therein sized to receive at least a portion of the body of said pie pan, a central open space at its front to provide a hand passage for facilitating placement and removal of a pie, a support portion bordering said opening and extending about said pie pan a substantial distance to both adequately support the weight of a pie and to restrain said pie against sliding movement in any direction, if subject to inertial forces during the transporting of said pie case, and a peripheral border portion;
   wherein a substantial part of both said peripheral border portion and said support portion are flanged at a downward angle with respect to the shelf proper for the purpose of increasing the strength and rigidity of said removable shelf;
   wherein said peripheral border portions of each shelf are flanged at an angle of less than 90° with respect to the shelf proper, and the compartment side walls include a plurality of opposed slideways which are disposed at the same downward angle and which are adapted to receive and hold said removable pie shelves in a vertically spaced configuration, whereby positioning of said removable shelves within the pairs of opposed slideways locks the side walls together, thereby enhancing the lateral bracing and strength of said housing.

2. A portable pie case according to claim 1, wherein said pie case further includes a front panel sized to extend from bottom-to-top and side-to-side of said housing, and wherein said side walls further include mounting means thereon, being adapted to receive and hold said front wall in a vertical position closing said pie receiving compartment.

3. A portable pie case according to claim 2, wherein said mounting means for receiving and holding said front wall comprises a pair of vertically opposed slideways situated at forward side locations on said case, each slideway being adapted to slidably receive an edge portion of said front wall therein.

4. A portable pie case according to claim 2, wherein said front wall is fabricated from a planar sheet of cardboard.

5. A portable pie case according to claim 1, wherein said housing further includes a plurality of spaced apart cleats projecting downwardly from its bottom wall, and a like number of complementary cleat receiving recesses formed in the upper surface of the top wall of said housing, so that plural pie cases can be stacked with the cleats of each upper case engaging the recesses of the case below it.

6. A portable pie case according to claim 1, wherein said housing is a monolithic casting from a structural plastic material.

7. A portable pie case according to claim 1, wherein said housing further includes a hand receiving opening in said top of said housing, said opening being laterally centered and midway between the front and rear of said housing, and wherein said opening is sized to receive a portion of a hand therethrough so that said housing can be lifted by the underside of the top.

8. A portable pie case according to claim 1, wherein each removable shelf has diagonally cut-off rear corner portions, preventing the unsanitary accumulation of food debris which would otherwise occur on the rear corners of said removable shelf.

9. A portable pie case for receiving and carrying a plurality of pies spaced vertically apart, each pie being disposed in a pie pan having a dish body and a peripheral lip, comprising:
   a housing having top, bottom, side and rear walls, together defining at least one pie receiving compartment;
   a plurality of removable pie shelves, wherein each shelf comprises a relatively thin sheet member having a pie receiving opening therein sized to receive at least a portion of the body of said pie pan, a central open space at its front to provide a hand passage for facilitating placement and removal of a pie, a support portion bordering said opening and extending about said pie pan a sufficient distance to both adequately support the weight of a pie and to restrain said pie against sliding movement in any direction, if subject to inertial force during the transporting of said pie case, and a peripheral border portion, wherein a substantial part of both said peripheral border portion and said support portion are flanged in a downward angle with respect to the shelf proper for the purpose of increasing the strength and rigidity of said removable shelf;
   mounting means on said side walls of said pie receiving compartment, adapted to receive and hold said removable pie shelves in a vertically spaced configuration;
   in combination with a delivery truck having, for said case, side wall mounting means including hook portions, wherein said pie case is adapted to be hand carried between a place where pies are manufactured, said delivery truck, and a customer's place of business, wherein said case further comprises:
   a plurality of spaced apart apertures defined by the rear wall of said housing, said apertures defining downwardly projecting, hook engaging portions of said rear wall which are adapted to interlock with the corresponding hook portions of its respective side wall mounting means within the delivery truck, for rigidly attaching each said pie case to a side wall of said delivery truck.

10. At least one pie case in combination with a delivery truck according to claim 9, wherein each said pie case includes upper and lower apertures in its rear wall interlockable with said side wall mounting means which include respective upper and lower hook portions, wherein said upper hook portions project a moderately greater distance from a side wall of said truck than do said lower hook portions, to angle mount each said pie case by causing the upper front portion of each said case to extend forwardly of the lower front portion of any other case mounted above it, and wherein the housing of each said pie case further includes forward side edge located slideways opening upwardly, and said front wall is a panel of sheet material which is slid into and out from said slideways, wherein the forward extension of the upper front portion of each said pie case permits installation and removal of said front wall while each said pie case is mounted on a side wall of a delivery truck.

11. At least one portable pie case in combination with a delivery truck according to claim 10, wherein each side wall of the delivery truck which mounts at least one pie case is outwardly inclined a moderate amount from its bottom to its top to at least partially level the tipping of its respective pie cases which are angle mounted; whereby being more level, the chance that the contents of each pie contained therein might tend to spill out is reduced.

* * * * *